April 23, 1935. V. J. BURNELLI 1,998,487
ALL-WING AIRPLANE
Filed Feb. 23, 1933   2 Sheets-Sheet 1
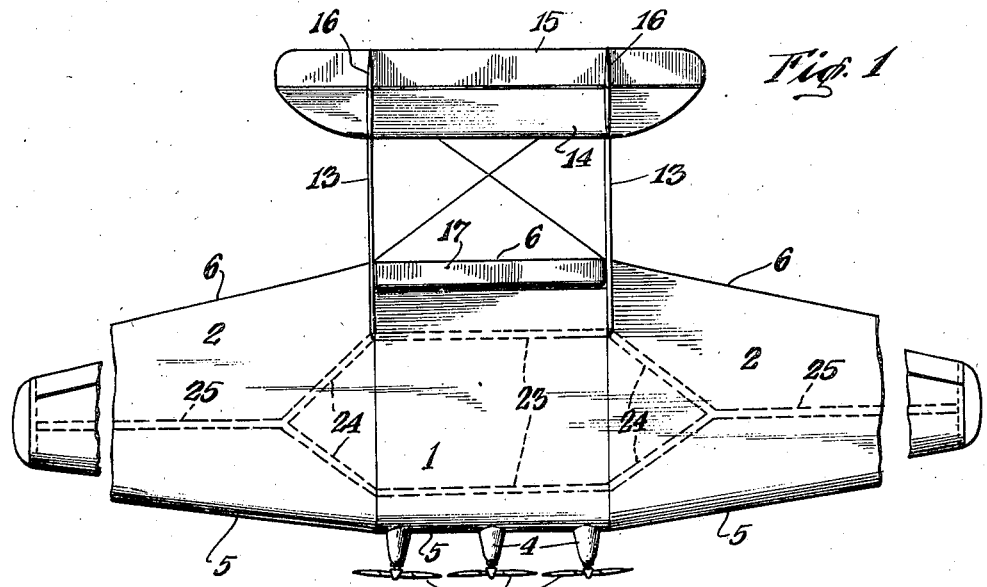
Fig. 1
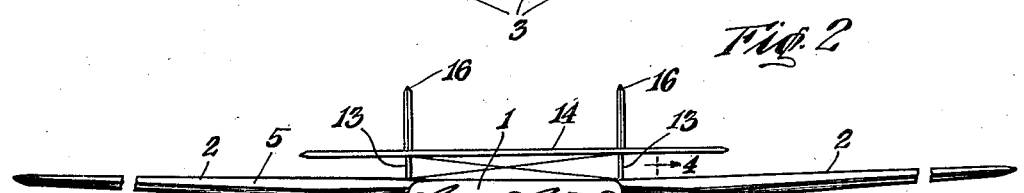
Fig. 2
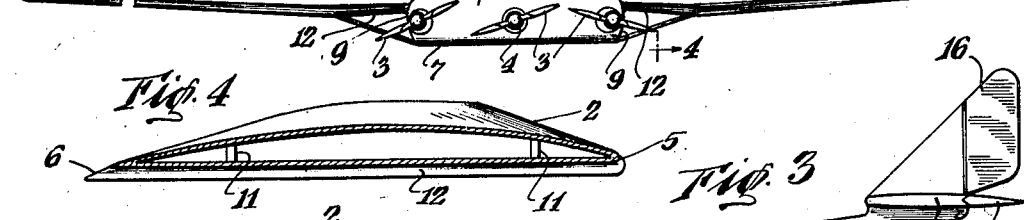
Fig. 4
Fig. 3
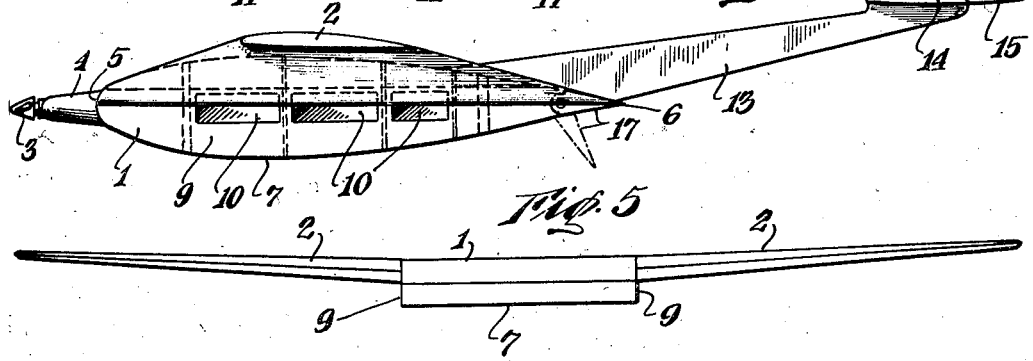
Fig. 5
INVENTOR
Vincent J. Burnelli
BY
Frederick W. Barker
ATTORNEY

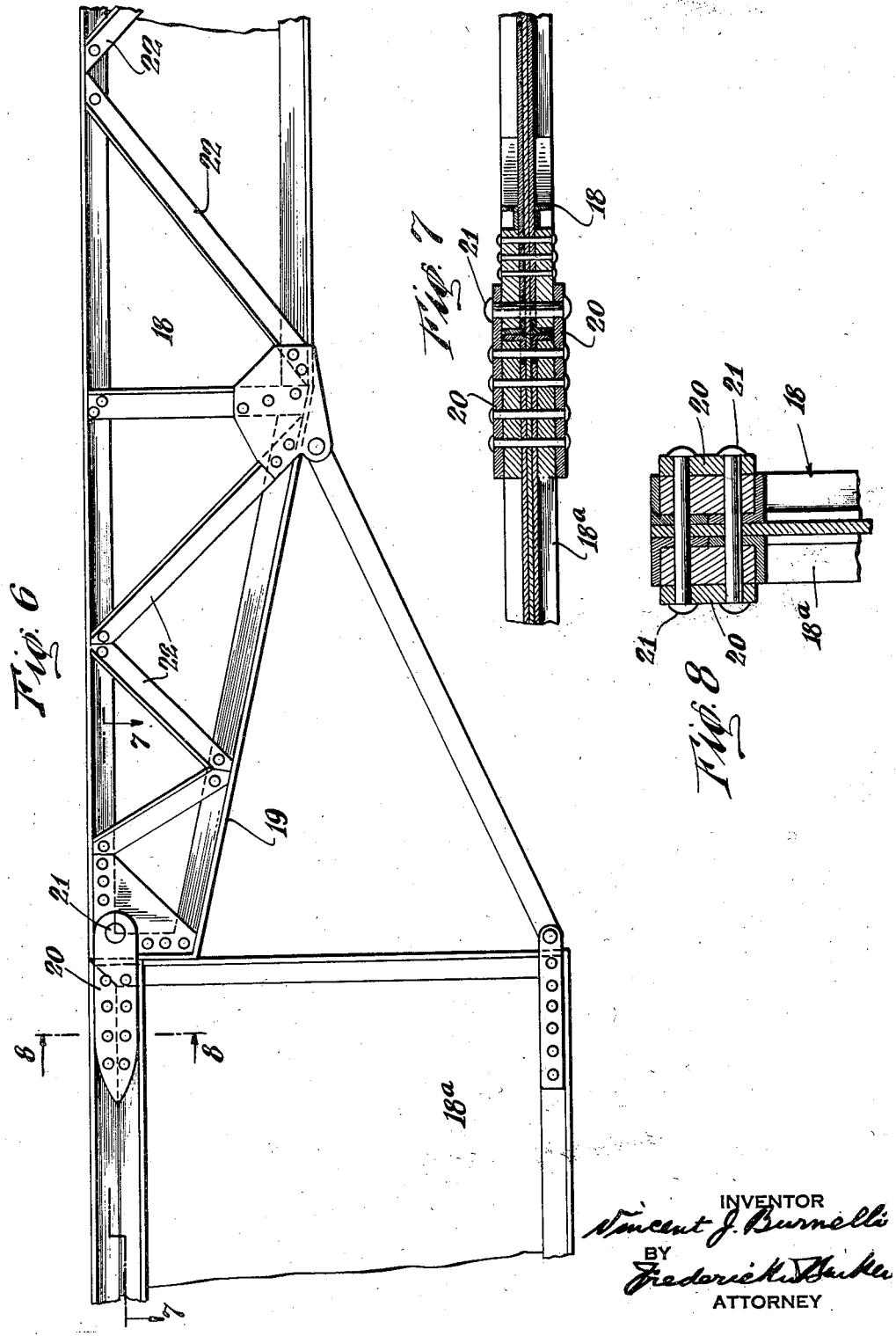

Patented Apr. 23, 1935

1,998,487

UNITED STATES PATENT OFFICE 1,998,487

ALL-WING AIRPLANE

Vincent J. Burnelli, New York, N. Y., assignor to Burnelli Aircraft, Ltd., Dover, Del., a corporation of Delaware Application February 23, 1933, Serial No. 658,117

5 Claims. (Cl. 244—14)

This invention relates to airplanes of the Burnelli or all-wing type, wherein the supporting airfoil, at least at its longitudinal centre, is adapted to house the useful load, whether that be passengers, or freight of any character, and to contain or support the power plant, as in the case of my earlier Patent No. 1,758,498.

My present improvements are directed particularly to certain structural features devised for the purpose of increasing the aerodynamical and other efficiencies of the craft, which features may be briefly summarized as follows:

Essentially the subject of this application is an all-wing monoplane that is provided with continuous spars and wherein the wing height diminishes outwardly. The upper surface of the wing is continuous spanwise from tip to tip, to best serve the function of dynamic lift, there being no corners or abutments for the creation of eddies or other disturbing air currents. But the wing height is increased in a central, longitudinal zone or section thereof, to provide the load containing compartment without having recourse to an undue wing height throughout, this central increase in wing height being obtained by lowering the bottom of the central section, whilst retaining its airfoil contour longitudinally, and providing side walls, for cabin enclosure. Another important feature is that the wing upper surface, which is also continuous chordwise, to have the benefit of uninterrupted suction lift throughout its effective area, is bounded in its horizontal plane by an unbroken line that extends about the trailing edge as well as about the entering edge, thus avoiding the creation of eddying currents and vortices such as would be created were the central section to be extended either forwardly of or rearwardly beyond the lateral wing sections.

The continuity of the wing upper surface, and the unbroken lines of the entering and trailing edges, are responsible for the attainment of a higher lift efficiency than is otherwise available.

The wing, besides diminishing in height outwardly, may also taper in its horizontal plane, which plane may also comprehend a suitable degree of dihedral, the reduction in height and chord enabling the outward wing portions to offer less head resistance than the more central wing portion.

The central wing section, with its depending excrescence or belly portion is intended to have relatively considerable width, to allow for the provision of a large cabin, and so that the leading edge may house a plurality of engines whose propellers may operate, clearingly of one another in front thereof.

Where the lateral wing portions join or merge with the central wing portion I may provide an undercut in their roots, so that unobstructed vision may be had through windows in the cabin walls, and, to reinforce these wing roots in the cantilever system thereof, struts are provided that angularly connect these lateral wing portions with the base of the central wing section.

Fins or stringers are extended rearwardly from the wing to carry the usual empennage, but in addition I may provide a rear flap that is included in the trailing edge of the central wing section, to serve as an adjustable stabilizer for longitudinal trim; also to function as a means of lift increase for landing purposes.

Other features and advantages of my invention will hereinafter appear.

In the drawings:

Figure 1 is a plan view, partly broken away, of my improved airplane.

Fig. 2 is a front view thereof.

Fig. 3 is a side elevation.

Fig. 4 is an enlarged section taken on the line 4—4 of Fig. 2.

Fig. 5 is a diagrammatic front view intended more particularly to show the merging of the upper surfaces of the wing central and lateral portions.

Fig. 6 is an enlarged partial skeleton view of a cantilever wing spar in its cut-away relation at the root with relation to the central or body frame portion.

Fig. 7 is a section on the line 7—7 of Fig. 6, and

Fig. 8 is a section on the line 8—8 of Fig. 6.

The wing or supporting airfoil illustrated herein is in the form of a single, continuous wing, but for convenience in its description it is here designated as comprising a central portion 1 and the laterally extending portions 2. In Fig. 1 the portions 2 are shown broken away, but the extent of the span would be represented by a continuation of the leading and trailing edge lines to a junction with the broken off tip portions.

In the example plural propellers 3 are shown located in advance of the leading edge, their shafts being supported by forwardly projecting housings 4, and the engines, (not appearing in the drawings) being carried by the wing sections 1.

The wing, composed of the unified sections 1, 2, and whose upper surface throughout is of continuous airfoil contour, has a continuous, unbroken leading edge 5, and a continuous, unbroken trailing edge 6, to attain the maximum efficiency in aerodynamic lift. But, the central section is enlarged by depressing its base 7 a suitable extent, to increase the depth of said central section, for cabin purposes. The thus depressed portion is provided with side walls 9, which may contain windows 10 and means of ingress and egress.

The spars 11 and the coverings therefor which constitute wing sections 2, are attenuated or as it were cut away at the roots, in the manner indicated at 12, so that they may abut against the walls 9 only at the upper portion of said walls, and may not block outward vision from the windows 10. Said windows, which are positioned at a suitable height from base 7, are placed wholly below the under surface of the wing sections 2, at their cut away or attenuated portions, and in this manner passengers within the cabin can have an unobstructed view through the windows.

This arrangement is clearly illustrated in Figs. 2 and 3, and in Fig. 4 the undercut 12 also appears.

In Fig. 1 the tail group is shown as supported by outriggers 13, which may be in the form of vertical fins, said tail group consisting of a fixed horizontal stabilizer 14, elevator 15 and vertical rudders 16. Included in the trailing edge there appears a pivotal stabilizer 17, which may be operated to serve for longitudinal trim purposes, or, when more fully depressed, as shown in dot and dash lines in Fig. 3, to increase the lift for landing purposes. The trailing edge of this stabilizer 17, in its normal position, is continuous with the trailing edge 6.

The cantilever spars, 18, shown in detail in Figs. 6 to 8, are continuous through the sections 1 and 2, though in section 1 they take the form of bulkheads, as at 18a, to comprise frame members for the cabin and provide a sturdy construction for the load carrying portion of the wing.

The spars 18, which each have the under cut portion 19, in conformity with the wing covering undercut 12, are secured to the bulkheads 18a as by the connecting members 20, 21, whose detailed construction is shown in Figs. 7 and 8.

The spars are also reinforced in their connection with the bulkheads by struts 22, that are secured to and extend angularly between the base of the bulkheads and the spars at the outward limit of the under cuts 19.

In some instances, where for example two bulkheads are provided in the central section 1, and it is desired to merge them with a single spar that extends through each of the sections 2, then, as shown in Fig. 1, in dotted lines, the bulkheads 23 may continue into the sections 2 in converging spars 24 that at their junction merge into a single spar 25, which continues out through the wing span.

Variations within the spirit and scope of my invention are equally comprehended by the foregoing disclosure.

I claim:

1. In an airplane having a wing composed of central and lateral sections, the central section having a depending portion, a pair of bulkheads in said central section, a single spar in each lateral section, and converging spars in each lateral section that connect said bulkheads with said single spar.

2. A monoplane comprising a wing whose upper surface throughout its entire span and chord is of continuous, substantially unobstructed airfoil camber, though tapering laterally, said wing having a central depending portion relatively wide with respect to its height with straight, parallel leading and trailing edges, said central depending portion being of sufficient depth to accommodate passengers and other load.

3. A monoplane comprising a wing whose upper surface throughout its entire span and chord is of continuous, substantially unobstructed airfoil camber, though tapering laterally, said wing having a central depending portion relatively wide with respect to its height with straight, parallel leading and trailing edges, said central depending portion being of sufficient depth to accommodate passengers and having exposed side walls containing windows.

4. A monoplane comprising a wing whose upper surface throughout its entire span and chord is of continuous, substantially unobstructed airfoil camber, though tapering laterally, said wing having a central depending lifting body portion relatively wide with respect to its height with airfoil contour of sufficient depth to accommodate passengers and other load.

5. A monoplane comprising a wing whose upper surface throughout its entire span and chord is of continuous, substantially unobstructed airfoil camber, though tapering laterally, said wing having a central depending lifting body portion relatively wide with respect to its height with airfoil contour of sufficient depth to accomodate passengers and other load and having exposed side walls containing windows.

VINCENT J. BURNELLI.